*(12)* United States Patent
Liu et al.

(10) Patent No.: US 7,243,544 B2
(45) Date of Patent: Jul. 17, 2007

(54) PASSIVE AND WIRELESS ACOUSTIC WAVE ACCELEROMETER

(75) Inventors: James Z T Liu, Belvidere, IL (US); Aziz Rahman, Sharon, MA (US)

(73) Assignee: Honeywell International Inc., Morristown, NJ (US)

( * ) Notice: Subject to any disclaimer, the term of this patent is extended or adjusted under 35 U.S.C. 154(b) by 142 days.

(21) Appl. No.: 11/156,008

(22) Filed: Jun. 16, 2005

(65) Prior Publication Data
US 2006/0283247 A1    Dec. 21, 2006

(51) Int. Cl.
*G01P 15/097*    (2006.01)
(52) U.S. Cl. ................................. 73/514.28
(58) Field of Classification Search ............. 73/514.28; 310/329
See application file for complete search history.

(56) References Cited

U.S. PATENT DOCUMENTS

| | | | |
|---|---|---|---|
| 3,863,497 A | 2/1975 | Van de Vaart et al. | |
| 4,346,597 A | 8/1982 | Cullen | |
| 4,467,235 A * | 8/1984 | De Wames et al. | 73/514.28 |
| 6,420,815 B1 | 7/2002 | Tanaka et al. | 310/313 A |
| 6,651,500 B2 | 11/2003 | Stewart et al. | 73/511 |
| 6,655,211 B1 | 12/2003 | Schmid et al. | 73/514.34 |
| 6,662,642 B2 * | 12/2003 | Breed et al. | 73/146 |
| 6,696,736 B2 | 2/2004 | Inoue et al. | 257/416 |
| 6,761,070 B2 | 7/2004 | Zarabadi et al. | 73/514.32 |
| 6,776,042 B2 | 8/2004 | Pike et al. | 73/514.32 |
| 6,789,424 B2 | 9/2004 | Knudsen et al. | 73/514.26 |
| 6,803,698 B2 * | 10/2004 | Tabota | 73/514.28 |
| 6,810,750 B1 * | 11/2004 | Kiefer et al. | 73/801 |
| 6,865,946 B2 | 3/2005 | Campbell | 73/513.32 |
| 6,870,302 B2 | 3/2005 | Nakamura et al. | 310/313 B |
| 6,873,931 B1 | 3/2005 | Nower et al. | 702/151 |
| 6,874,363 B1 | 4/2005 | Foote et al. | 73/514.29 |
| 6,883,638 B1 | 4/2005 | Maxwell et al. | 181/102 |
| 2002/0014119 A1 | 2/2002 | Williams | |
| 2005/0059357 A1 | 3/2005 | Edmonson et al. | 455/74 |

FOREIGN PATENT DOCUMENTS

| | | |
|---|---|---|
| EP | 0456285 A2 | 11/1991 |
| GB | 2144546 A | 3/1985 |
| GB | 2175090 A | 11/1986 |
| WO | WO 2004/000578 A2 | 12/2003 |

OTHER PUBLICATIONS

V.K. Varadan et al., "Rabrication, characterization, and testing of wireless MEMS-IDT based microaccelerometers," Sensors and Actuators A 90 (2001), pp. 7-19.*
Pohl A. et al, Wirelessly Interrogable Passive SAW Sensors, Application for Permanent Monitoring of Tire Pressure, VDI Berichte, Duesseldorf, DE, Oct. 1997, pp. 305-318.

* cited by examiner

*Primary Examiner*—John E. Chapman
(74) *Attorney, Agent, or Firm*—Kermit D. Lopez; Luis M. Ortiz; William B. Shelby (57) ABSTRACT

An acoustic wave acceleration sensor comprises an acoustic wave device including a plate that functions as a propagation medium and at least one interdigital transducer configured upon the plate. One or more antennas can be integrated with the acoustic wave device, wherein the antenna(s) communicates with interdigital transducers. Such antennas can receive wireless interrogation signals and transmit signals indicative of acceleration data.

19 Claims, 5 Drawing Sheets

$$f = \frac{V}{2d} = \frac{1}{2d}\sqrt{\frac{C_{66}}{\rho}}$$

V → propagation velocity
d → thickness of plate
$C_{66}$ → stiffness, responsible for shear movement
ρ → density

PASSIVE AND WIRELESS ACOUSTIC WAVE ACCELEROMETER

TECHNICAL FIELD

Embodiments are generally related to sensing devices and components thereof. Embodiments also related to acoustic wave devices. Embodiments also relate to the wireless transmission of sensed data. Embodiments additionally relate to acceleration sensors or accelerometers.

BACKGROUND OF THE INVENTION

Acoustic wave sensors are utilized in a variety of sensing applications, such as, for example, temperature and/or pressure sensing devices and systems. Acoustic wave devices have been in commercial use for over sixty years. Although the telecommunications industry is the largest user of acoustic wave devices, they are also used for in other areas, such as chemical vapor detection. Acoustic wave sensors are so named because they use a mechanical, or acoustic, wave as the sensing mechanism. As the acoustic wave propagates through or on the surface of the material, any changes to the propagation path affect the characteristics of the wave.

Changes in acoustic wave characteristics can be monitored by measuring the frequency or phase characteristics of the sensor and can then be correlated to the corresponding physical quantity or chemical quantity that is being measured. Virtually all acoustic wave devices and sensors utilize a piezoelectric crystal to generate the acoustic wave. Three mechanisms can contribute to acoustic wave sensor response, i.e., mass-loading, visco-elastic and acousto-electric effect. The mass-loading of chemicals alters the frequency, amplitude, and phase and Q value of such sensors. Most acoustic wave chemical detection sensors, for example, rely on the mass sensitivity of the sensor in conjunction with a chemically selective coating that absorbs the vapors of interest resulting in an increased mass loading of the acoustic wave sensor.

Examples of acoustic wave sensors include acoustic wave detection devices, which are utilized to detect the presence of substances, such as chemicals, or environmental conditions such as temperature and pressure. An acoustical or acoustic wave (e.g., SAW/BAW) device acting as a sensor can provide a highly sensitive detection mechanism due to the high sensitivity to surface loading and the low noise, which results from their intrinsic high Q factor. Surface acoustic wave devices are typically fabricated using photolithographic techniques with comb-like interdigital transducers placed on a piezoelectric material. Surface acoustic wave devices may have either a delay line or a resonator configuration. Bulk acoustic wave device are typically fabricated using a vacuum plater, such as those made by CHA, Transat or Saunder. The choice of the electrode materials and the thickness of the electrode are controlled by filament temperature and total heating time. The size and shape of electrodes are defined by proper use of masks.

Acoustic wave devices, such as, for example, a surface acoustic wave resonator (SAW-R), a surface acoustic wave delay line (SAW-DL) device, a surface transverse wave (STW) device, or a bulk acoustic wave (BAW) device, have been utilized in mechanical quantities measurement. In such sensing applications, the sensing devices or components are typically clamped or oriented in the most sensitive direction to the mechanical quantities.

The most important difference between an acoustic wave device and a conventional wired sensor is that the acoustic wave device can store energy mechanically. Once such a device is supplied with a certain amount of energy (e.g., through RF—Radio Frequency), the device can operate for a time without any active parts (i.e., without a power supply or oscillators). Such a configuration makes it possible for acoustic waves to function in RF powered passive and wireless sensing applications.

One area where acoustic wave devices seem to have promise is in the area of wireless acceleration detection. One of the problems with current acoustic wave sensors utilized for acceleration detection is that such devices are limited both in their ability to accurately detect acceleration and their placement with respect to an accelerating body. This is because such devices are wired-based. To date, passive and wireless acoustic wave accelerometers have not been successfully implemented. It is believed that the device disclosed herein overcomes the problems associated with current acoustic wave sensing devices.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved sensing device.

It is another aspect of the present invention to provide for an improved acoustic wave sensing device It is yet another aspect of the present invention to provide for a wireless and passive acoustic wave sensor.

It is a further aspect of the present invention to provide for an acoustic wave accelerometer or acceleration sensor.

The aforementioned aspects and other objectives and advantages can now be achieved as described herein. An acoustic wave acceleration sensor (i.e., accelerometer) is disclosed, which comprises an acoustic wave device including a plate that functions as a propagation medium and at least one interdigital transducer configured upon the plate. One or more antennas can be integrated with the acoustic wave device, wherein the antenna(s) communicates with interdigital transducers. Such antennas can receive wireless interrogation signals and transmit signals indicative of acceleration data.

The acoustic wave device is generally clamped at one end of the plate to an object under acceleration and submitted to a force at the free end of the plate. An inertial mass is fixed at the free end of the plate such that when the acceleration is applied to the acoustic wave device, the acceleration is converted to a proportional force through utilization of the inertial mass fixed at the free end of the plate, wherein the proportional force interacts with an acoustic propagation through a plurality of forces applied to the propagation medium, thereby generating signals indicative of the acceleration data for wireless transmission from the antenna.

The interdigital transducers can be configured, for example, as BAW, SAW-R, or SAW-DL electrodes. The plate itself can comprise a piezoelectric substrate. The acceleration data for wireless transmission from the antenna is based on at least one change produced in an acoustic phase velocity associated with the acoustic wave device by a presence of a static mechanical polarization applied to the propagation medium.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
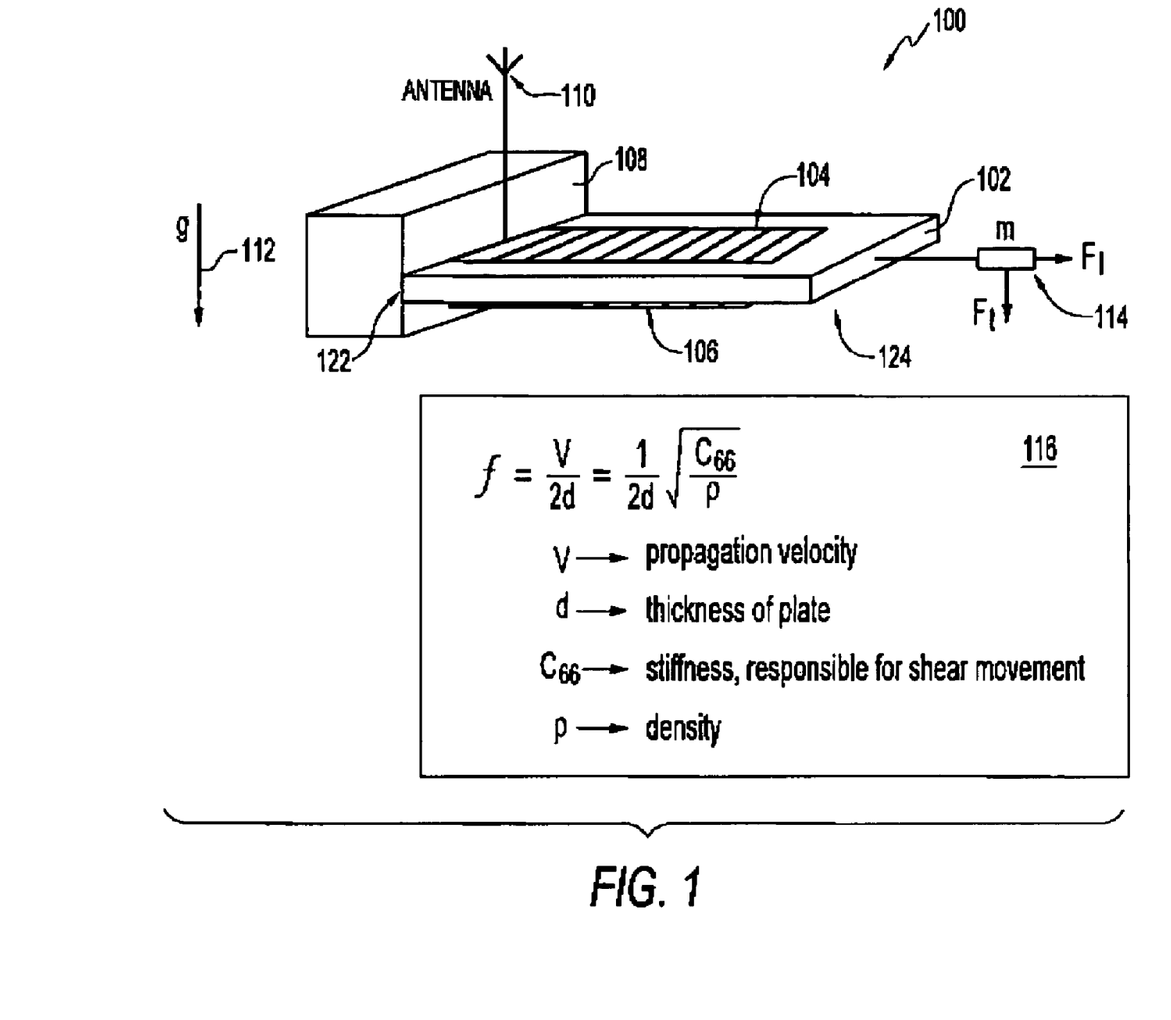
FIG. 1 illustrates a perspective view of a wireless and passive acoustic wave accelerometer having a plurality of BAW (Bulk Acoustic Wave) electrodes, in accordance with one embodiment.

FIG. 1 illustrates a perspective view of a wireless and passive acoustic wave accelerometer 100 having a plurality of BAW (Bulk Acoustic Wave) electrodes 104 and 106, in accordance with one embodiment. The wireless and passive acoustic wave accelerometer 100 is generally formed from a piezoelectric substrate 102. Electrodes 104 and 106 are configured upon substrate 102. Each electrode 104, 106 comprise an interdigital transducer (IDT). The wireless and passive acoustic wave accelerometer 100 generally functions as an acceleration sensor or detector.

Piezoelectric substrate 102 can be formed from a variety of substrate materials, such as, for example, quartz, lithium niobate (LiNbO$_3$), lithium tantalite (LiTaO$_3$), Li$_2$B$_4$O$_7$, GaPO$_4$, langasite (La$_3$Ga$_5$SiO$_{14}$), ZnO, and/or epitaxially grown nitrides such as Al, Ga or Ln, to name a few. Interdigital transducers 104 and 106 can be formed from materials, which are generally divided into three groups. First, IDT or electrodes 104, 106 can be formed from a metal group material (e.g., Al, Pt, Au, Rh, Ir Cu, Ti, W, Cr, or Ni). Second, IDT or electrodes 104, 106 can be formed from alloys such as NiCr or CuAl. Third, IDT or electrodes 104, 106 can be formed from metal-nonmetal compounds (e.g., ceramic electrodes based on TiN, CoSi$_2$, or WC). In the configuration depicted in FIG. 1, IDT or electrodes 104, 106 generally comprise BAW electrodes. IDT or electrode 104 is formed on one side of substrate 102, while IDT or electrodes 106 is formed on the opposite side of substrate 102.

An antenna 110 can be connected to substrate 102 and communicate with BAW electrodes 104 and 106. Antenna 110 is utilized for the wireless transmission or receipt of data. For example, an Interrogation signal can be transmitted to antenna 110. Object 108 represents a component or device under acceleration. Mass and transverse and lateral forces thereof are illustrated by block 114. In general block 114 represents an inertial mass fixed at the free end 124 of plate 102. The transverse force Is labeled Ft while the lateral force is labeled Fl. Gravity Is indicated generally by arrow 112 in FIG. 1. Additionally, the following equation (1) is illustrated in block 116:

$$f = \frac{V}{2d} = \frac{1}{2d}\sqrt{\frac{C_{GG}}{\rho}} \tag{1}$$

Equation (1) relates generally to the values associated with the function of accelerometer 100. Thus, V represents propagation velocity. The variable d on the other hand represents the thickness of the plate or substrate 102. The variable $C_{GG}$ represents stiffness, which is responsible for shear movement. Finally, the variable $\rho$ represents density.

In the configuration depicted in FIG. 1, the operations of accelerometer 100 is generally based on the changes produced in the acoustic phase velocity by the presence of a static or a slowly varying mechanical polarization applied to the propagation medium. The basic acoustic wave acceleration sensor or accelerometer 100 comprises substrate or plate 102 for acoustical wave propagation. The sensor or accelerometer 100 is clamped at one end 122 thereof and submitted to a force at a free end 124. When acceleration is applied, the resulting values are converted to a proportional force through the use of inertial mass fixed at the free end 124 of the plate as indicated generally by block 114. The applied force interacts with the acoustic propagation through three components applied to the propagation medium: two bending forces that are perpendicular to the propagation surface and transverse thereof, along with a longitudinal or compression force.

Figure 2:
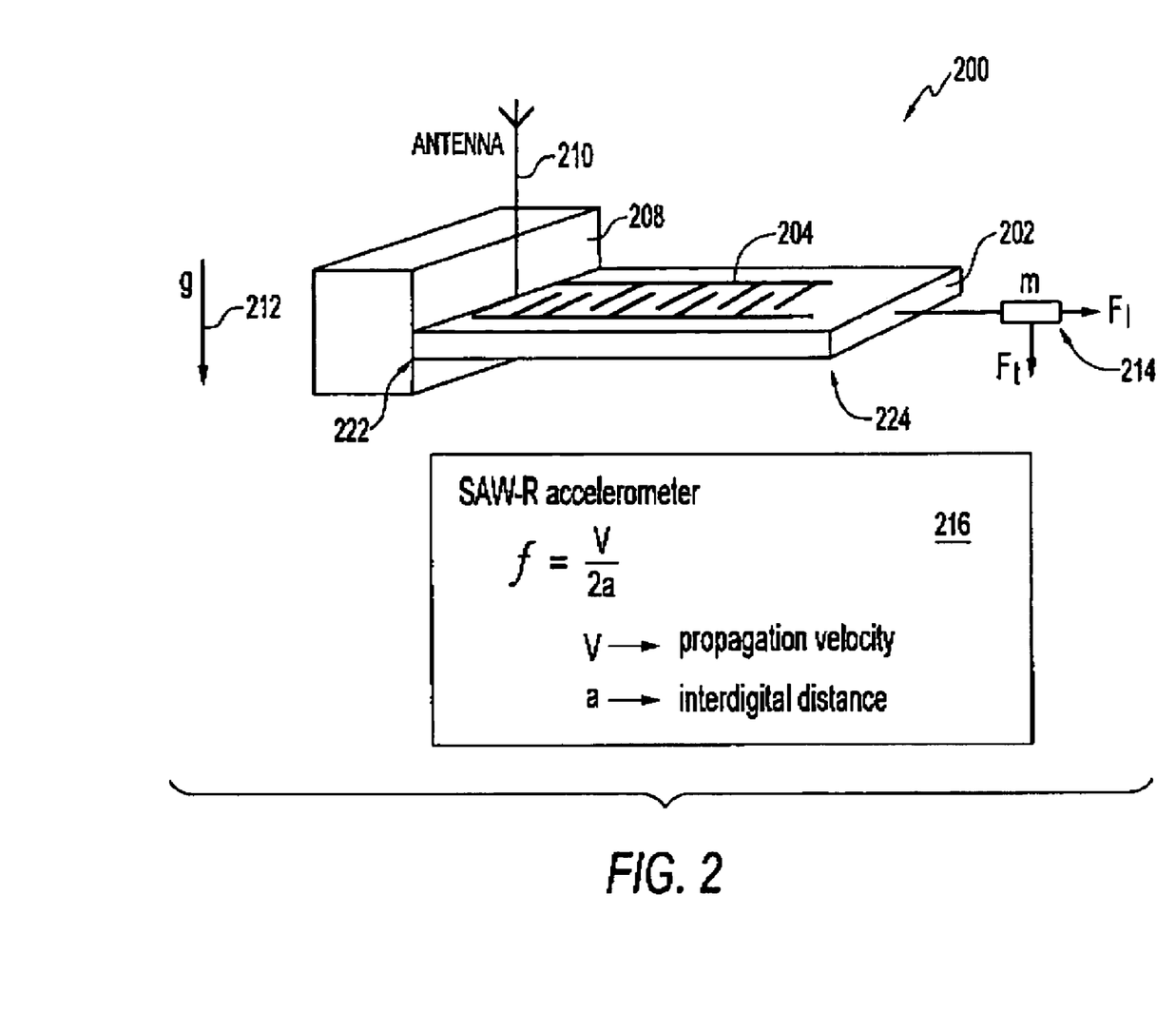
FIG. 2 illustrates a perspective view of a SAW-R wireless and passive acoustic wave accelerometer, in accordance with another embodiment.

FIG. 2 illustrates a perspective view of a SAW-R wireless and passive acoustic wave accelerometer 200, in accordance with another embodiment. The wireless and passive acoustic wave accelerometer 200 is generally formed from a piezoelectric substrate 202. Electrode 204 is configured upon substrate 202 and generally comprises an interdigital transducer (IDT). The SAW-R wireless and passive acoustic wave accelerometer 200 generally functions as an acceleration sensor or detector.

Piezoelectric substrate 202 can be formed from a variety of substrate materials, such as, for example, quartz, lithium niobate (LiNbO$_3$), lithium tantalite (LiTaO$_3$), Li$_2$B$_4$O$_7$, GaPO$_4$, langasite (La$_3$Ga$_5$SiO$_{14}$), ZnO, and/or epitaxially grown nitrides such as Al, Ga or Ln, to name a few. IDT or electrode 204 can be formed from materials, which are generally divided into three groups. First, IDT or electrode 204 can be formed from a metal group material (e.g., Al, Pt, Au, Rh, Ir Cu, Ti, W, Cr, or Ni). Second, IDT or electrode 204 can be formed from alloys such as NiCr or CuAl. Third, IDT or electrode 204 can be formed from metal-nonmetal compounds (e.g., ceramic electrodes based on TiN, CoSi$_2$, or WC). In the configuration depicted in FIG. 1, IDT or electrode 204 generally comprise a SAW-R electrode.

An antenna 210 can be connected to substrate 202 and can communicate with SAW-R electrode 204. Antenna 210 is utilized for the wireless transmission or receipt of data. For example, an interrogation signal can be transmitted to antenna 210. Object 208 represents a component or device under acceleration. Mass and transverse and lateral forces thereof are illustrated by block 214. In general block 214 represents an inertial mass fixed at the free end 224 of plate 202. The transverse force is labeled $F_t$ while the lateral force is labeled $F_l$. Gravity is indicated generally by arrow 112 in FIG. 2. Additionally, the following equation (2) is illustrated in block 216:

$$f = \frac{V}{2a} \quad (2)$$

Equation (2) relates generally to the values associated with the function of accelerometer 200. Thus, V represents propagation velocity. The variable a on the other hand represents the interdigital distance. That is the distance of IDT electrode 204 (i.e. a SAW-R electrode).

In the configuration depicted in FIG. 2, the operations of accelerometer 200 are generally based on the changes produced in the acoustic phase velocity by the presence of a static or a slowly varying mechanical polarization applied to the propagation medium. The basic acoustic wave acceleration sensor or accelerometer 200 comprises substrate or plate 202 for acoustical wave propagation. The sensor or accelerometer 200 is clamped at one end 222 thereof and submitted to a force at a free end 224. When acceleration is applied, the resulting values are converted to a proportional force through the use of inertial mass fixed at the free end 224 of the plate as indicated generally by block 214. The applied force interacts with the acoustic propagation through three components applied to the propagation medium: two bending forces that are perpendicular to the propagation surface and transverse thereof, along with a longitudinal or compression force.

Figure 3:
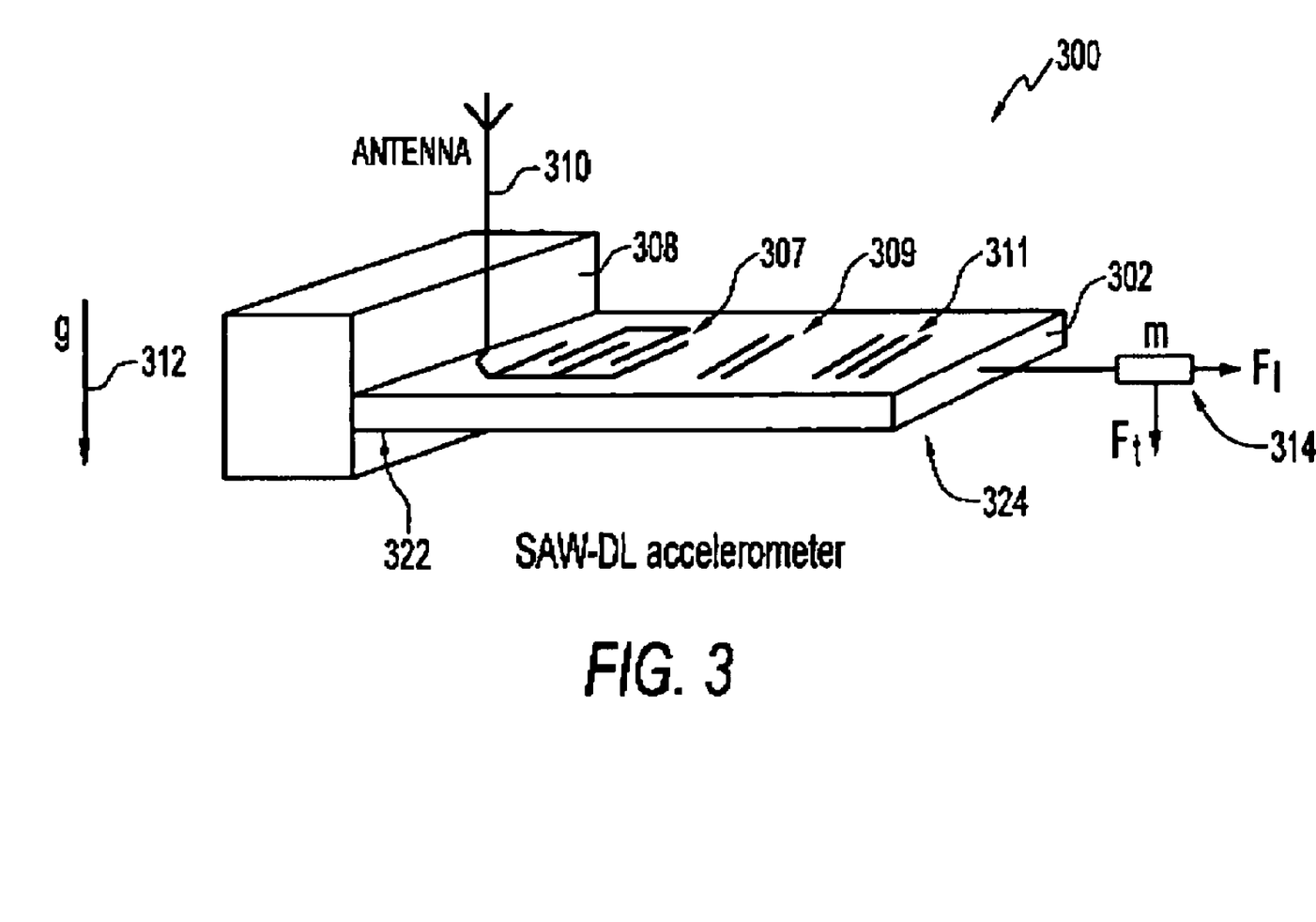
FIG. 3 illustrates a perspective view of a SAW-DL wireless and passive acoustic wave accelerometer, in accordance with an alternative embodiment.

FIG. 3 illustrates a perspective view of a SAW-DL wireless and passive acoustic wave accelerometer 300, in accordance with an alternative embodiment. The SAW-DL wireless and passive acoustic wave accelerometer 300 (i.e., acceleration sensor) includes a plurality of SAW-DL electrodes or IDTs 307, 309, and 311 wherein are generally formed upon a piezoelectric substrate 302.

Piezoelectric substrate 202 can be formed from a variety of substrate materials, such as, for example, quartz, lithium niobate (LiNbO$_3$), lithium tantalite (LiTaO$_3$), Li$_2$B$_4$O$_7$, GaPO$_4$, langasite (La$_3$Ga$_5$SiO$_{14}$), ZnO, and/or epitaxially grown nitrides such as Al, Ga or Ln, to name a few. The SAW-DL electrodes or IDTs 307, 309, 311 can be formed from materials, which are generally divided into three groups. First, SAW-DL electrodes or IDTs 307, 309, 311 can be formed from a metal group material (e.g., Al, Pt, Au, Rh, Ir Cu, Ti, W, Cr, or Ni). Second, SAW-DL electrodes or IDTs 307, 309, 311 can be formed from alloys such as NiCr or CuAl. Third, SAW-DL electrodes or IDTs 307, 309, 311 can be formed from metal-nonmetal compounds (e.g., ceramic electrodes based on TiN, CoSi$_2$, or WC).

An antenna 310 can be connected to substrate 302 and communicate with SAW-DL electrodes or IDTs 307, 309, 311. Antenna 310 is utilized for the wireless transmission or receipt of data. For example, an interrogation signal can be transmitted to antenna 310. Object 308 represents a component or device under acceleration. Mass and transverse and lateral forces thereof are illustrated by block 314. In general block 314 represents an inertial mass fixed at the free end 324 of plate 302. The transverse force is labeled $F_t$ while the lateral force is labeled $F_l$.

In the configuration depicted in FIG. 3, the operations of accelerometer 300 are generally based on the changes produced in the acoustic phase velocity by the presence of a static or a slowly varying mechanical polarization applied to the propagation medium. The basic acoustic wave acceleration sensor or accelerometer 300 comprises substrate or plate 302 for acoustical wave propagation. The sensor or accelerometer 300 is generally clamped at one end 322 thereof and submitted to a force at a free end 324. When acceleration is applied, the resulting values are converted to a proportional force through the use of inertial mass fixed at the free end 324 of the plate as indicated generally by block 314. The applied force interacts with the acoustic propagation through three components applied to the propagation medium: two bending forces that are perpendicular to the propagation surface and transverse thereof, along with a longitudinal or compression force.

Based on the foregoing it can be appreciated that a wireless and passive acoustic wave accelerometer can be arranged in a variety of designs, such as, BAW, SAW-R and/or SAW-delay line configurations. Such devices can operate passively, wirelessly and also with a high degree of reliability. The SAW-DL wireless and passive acoustic wave accelerometer illustrated in FIG. 3, for example, provides for low power consumption and good sensitivity. The BAW accelerometer 100 depicted in FIG. 1 provides for the highest sensitivity of the three devices illustrated herein. The temperature dependence of each sensor 100, 200, 300 is reproducible and in most cases, thermal strain from the mounting thereof dominates thermal variations of material properties. This temperature dependence can be eliminated, however, by using a two-sensor configuration. The acceleration sensors 100, 200, 300 are thus sensitive to transverse and longitudinal forces. The transverse forces induce stronger effects.

Figure 4:
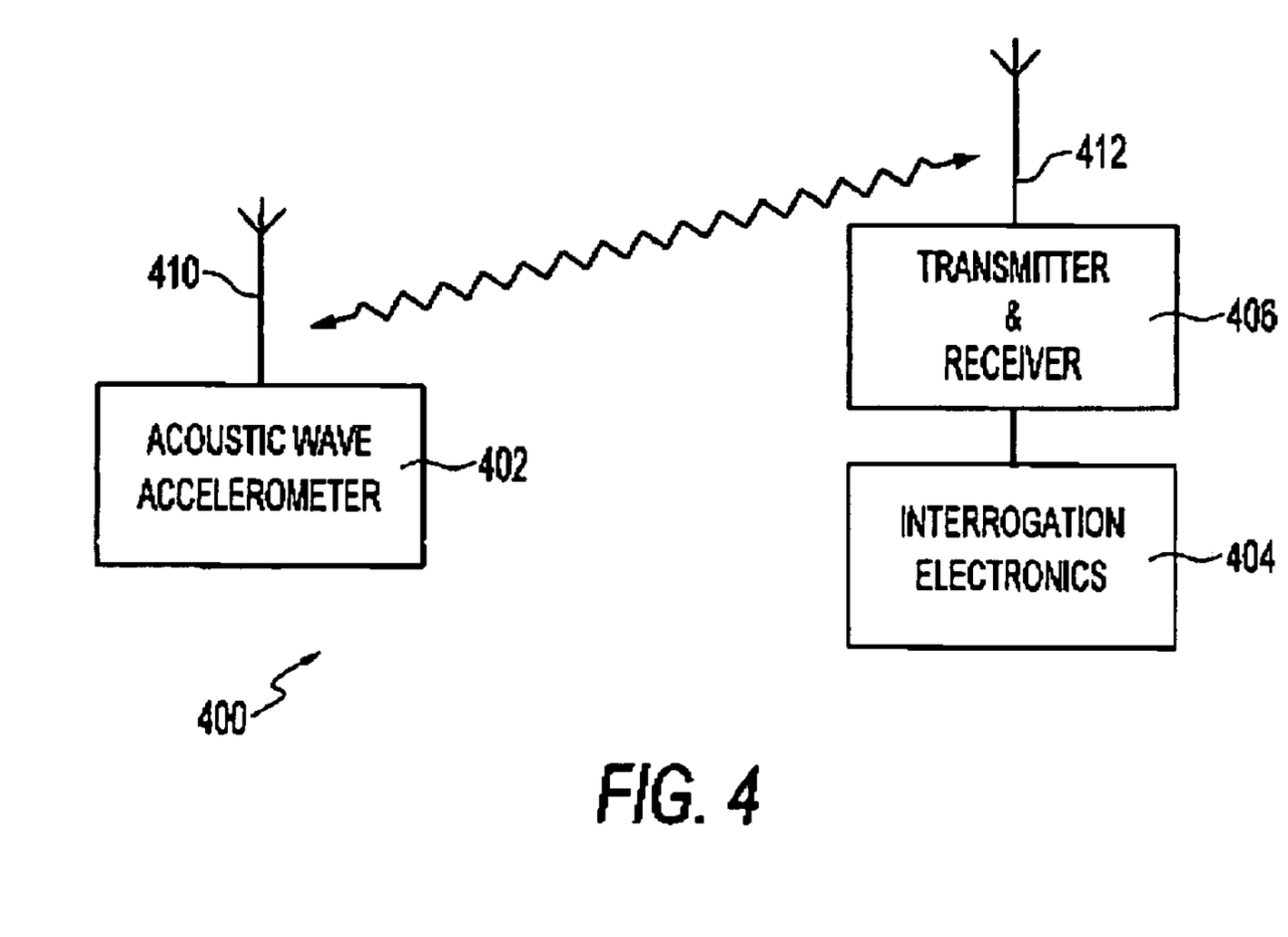
FIG. 4 illustrates a block diagram of a passive and wireless acoustic wave acceleration sensing system, in accordance with a preferred embodiment.

FIG. 4 illustrates a block diagram of a passive and wireless acoustic wave acceleration sensing system 400, in accordance with a preferred embodiment. System 400 generally includes a passive and wireless acoustic wave accelerometer 402, which is analogous to acceleration sensors 100, 200, or 300 which were described and depicted herein with respect to FIGS. 1, 2 and 3. An antenna 410 is connected to accelerometer 400 and is similar to antennas 110, 210 or 310 described herein. An antenna 412 is connected to a transmitter and receiver unit 406, which in turn is connected to interrogation electronics 404. Thus, acceleration data detected and generated by acoustic wave accelerometer 402 can be transmitted via antenna 410 to antenna 412. Alternatively, a wireless interrogation signal can be transmitted from antenna 412 to antenna 410.

Based on the foregoing, it can be appreciated that various embodiments can be implemented in accordance with the systems and devices disclosed herein. For example, in one embodiment an acceleration sensor can be implemented, which includes an acoustic wave device including a plate that functions as a propagation medium and one or more interdigital transducers configured upon the plate. One or more antennas can be integrated with the acoustic wave device, wherein the antenna communicates with one or more of the interdigital transducers such that the antenna receives and transmits signals indicative of acceleration data. The acoustic wave device is generally clamped at one end of the plate to an object under acceleration and submitted to a force at the free end of the plate. An inertial mass is generally fixed at the free end of the plate such that when the acceleration is applied to the acoustic wave device, the acceleration is converted to a proportional force through utilization of the inertial mass fixed at the free end of the plate, wherein the proportional force interacts with an acoustic propagation through a plurality of forces applied to the propagation medium, thereby generating signals indicative of the acceleration data for wireless transmission from the antenna.

The interdigital transducer(s) utilized can be, for example, a SAW filter electrode, wherein the frequency of the SAW filter electrode comprises data indicative of the acceleration. The interdigital transducer(s) utilized may also be configured as a SAW-R electrode, wherein the frequency of the SAW-R electrode comprises data indicative of the acceleration. Additionally, the interdigital transducer(s) may be configured as a SAW-DL electrode, such that the phase of the SAW DL electrode comprises data indicative of the acceleration. The plate itself may be formed from a piezoelectric substrate.

The acceleration data for wireless transmission from the antenna is generally based on at least one parameter change produced in an acoustic phase velocity associated with the acoustic wave device by a presence of a static mechanical polarization applied to the propagation medium. Alternatively, the acceleration data for wireless transmission from the antenna can be based on at least one parameter change produced in an acoustic phase velocity associated with the acoustic wave device by a presence of a slowly varying mechanical polarization applied to the propagation medium.

Figure 5:
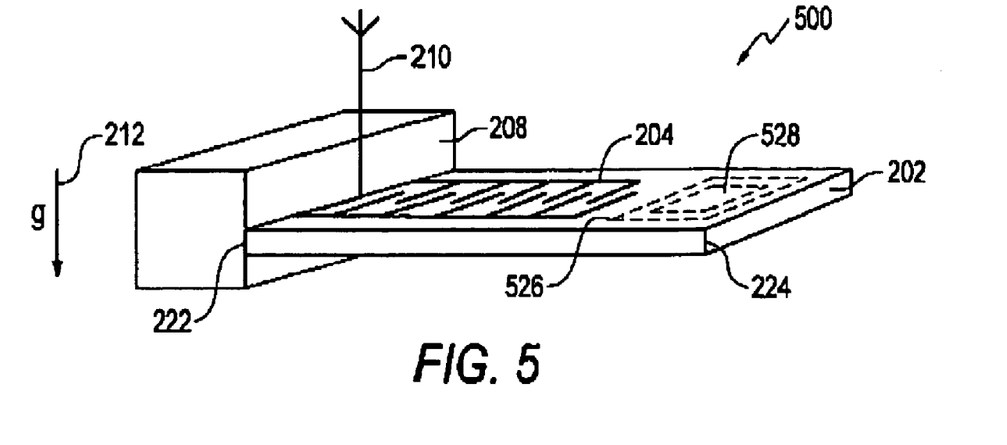
FIG. 5 illustrates a perspective view of a SAW wireless and passive acoustic wave accelerometer, in accordance with an alternative embodiment.

FIG. 5 illustrates a perspective view of a SAW wireless and passive acoustic wave accelerometer 500. In accordance with another embodiment, an acceleration sensor may be configured that includes an acoustic wave device Including a plate that functions as a propagation medium and at least one interdigital transducer configured upon the plate. An antenna can be integrated with the acoustic wave device, wherein the antenna communicates with interdigital transducer(s). The antenna receives and transmits signals Indicative of acceleration data, wherein the acoustic wave device is clamped at one end of the plate to an object under acceleration and submitted to a force at the free end of the plate. Additionally, as indicated herein, an etched rectangular frame-shaped channel 526 located on a back side of the at least one interdigital transducer, such that a mass 528 within the etched rectangular frame-shaped channel possesses a high sensitivity to the acceleration when the acceleration is applied to the acoustic wave device 500. The acceleration can be converted to a proportional force through utilization of the mass, wherein the proportional force interacts with an acoustic propagation through a plurality of forces applied to the propagation medium, thereby generating signals indicative of the acceleration data for wireless transmission from the antenna.

Figure 6:
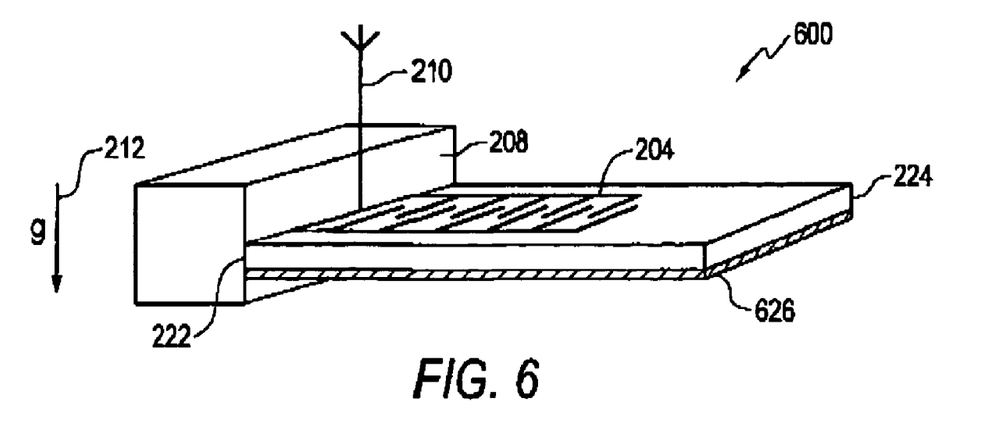
FIG. 6 illustrates a perspective view of a SAW wireless and passive acoustic wave accelerometer, in accordance with an alternative embodiment.

FIG. 6 illustrates a perspective view of a SAW wireless and passive acoustic wave accelerometer 600. In accordance with another embodiment, an acceleration sensor may be implemented, which includes an acoustic wave device that comprises a plate that functions as a propagation medium and an interdigital transducer(s) configured upon the plate, and an antenna integrated with the acoustic wave device. The antenna communicates with the interdigital transducer(s) such that the antenna receives and transmits signals Indicative of acceleration data, wherein the acoustic wave device is clamped at one end of the plate to an object under acceleration and submitted to a force at the free end of the plate. A coating with a heavy mass 626 can be provided with the acoustic wave sensor, such that the acoustic wave sensor possesses a high sensitivity to the acceleration when the acceleration is applied to the acoustic wave device. The acceleration Is converted to a proportional force through utilization of the mass, wherein the proportional force interacts with an acoustic propagation through a plurality of forces applied to the propagation medium, thereby generating signals indicative of the acceleration data for wireless transmission from the antenna.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An acceleration sensor, comprising:
   an acoustic wave device including a plate that functions as a propagation medium and at least one Interdigital transducer configured upon said plate; and
   an antenna integrated with said acoustic wave device, wherein said antenna communicates with said at least one interdigital transducer such that said antenna receives and transmits signals indicative of acceleration data, wherein said acoustic wave device is clamped at one end of said plate to an object under an acceleration wherein said plate is positioned such that said plate is perpendicular to said acceleration and submitted to a force at said free end of said plate; and
   an inertial mass fixed to said plate such that when said acceleration is applied to said acoustic wave device perpendicularly to said plate, said acceleration is converted to a proportional force through utilization of said inertial mass, thereby generating signals indicative of said acceleration data for wireless transmission from said antenna.

2. The sensor of claim 1 wherein said acoustic wave device comprises a BAW device, wherein frequency data of said BAW device comprises data indicative of said acceleration.

3. The sensor of claim 1 wherein said acoustic wave device comprises a SAW-R device wherein frequency data of said SAW-R device comprises data indicative of said acceleration.

4. The sensor of claim 1 wherein said acoustic wave device comprises a SAW-DL device wherein phase data of said SAW DL device comprises data indicative of said accelerations.

5. The sensor of claim 1 wherein said plate comprises a piezoelectric substrate.

6. The sensor of claim 1 wherein said acceleration data for wireless transmission from said antenna is based on at least one parameter change produced in an acoustic phase velocity associated with said acoustic wave device.

7. The sensor of claim 1 wherein said inertial mass is fixed at end of said plate.

8. An acceleration sensor, comprising:
   an acoustic wave device including a plate that functions as a propagation medium and at least one interdigital transducer configured upon said plate;
   an antenna integrated with said acoustic wave device, wherein said antenna communicates with said at least one interdigital transducer such that said antenna receives and transmits signals indicative of acceleration data, wherein said acoustic wave device is clamped at one end of said plate to an object under an acceleration wherein said acceleration is in a direction perpendicular to said plate and submitted to a force at said free end of said plate; and
   an etched rectangular frame-shaped channel located on a back side of said at least one interdigital transducer, such that a mass within said etched rectangular frame-shaped channel possesses a high sensitivity to said acceleration when said acceleration is applied to said acoustic wave device; and wherein said acceleration is converted to a proportional force, thereby generating signals indicative of said acceleration data for wireless transmission from said antenna.

9. The sensor of claim 8 wherein said acoustic wave device comprises a BAW device, wherein frequency data of said BAW device comprises data indicative of said acceleration.

10. The sensor of claim 8 wherein said acoustic wave device comprises a SAW-R device, wherein frequency data of said SAW-R device comprises data indicative of said acceleration.

11. The sensor of claim 8 wherein said acoustic wave device comprises a SAW-DL device, wherein a phase of said SAW-DL device comprises data indicative of said acceleration.

12. The sensor of claim 8 wherein said plate comprises a piezoelectric substrate.

13. The sensor of claim 8 wherein said acceleration data for wireless transmission from said antenna is based on at least one parameter change produced in an acoustic phase velocity associated with said acoustic wave device.

14. An acceleration sensor, comprising:
an acoustic wave device including a plate that functions as a propagation medium and at least one Interdigital transducer configured upon said plate; and
an antenna integrated with said acoustic wave device, wherein said antenna communicates with said at least one interdigital transducer such that said antenna receives and transmits signals indicative of acceleration data, wherein said acoustic wave device is clamped at one end of said plate to an object under an acceleration wherein said acceleration is in a direction perpendicular to said plate and submitted to a force at said free end of said plate; and a coating with a heavy mass such that said acoustic wave sensor possesses a high sensitivity to said acceleration when said acceleration is applied to said acoustic wave device, such that said acceleration is converted to a proportional force, thereby generating signals indicative of said acceleration data for wireless transmission from said antenna.

15. The sensor of claim 14 wherein said acoustic wave device comprises a BAW device, wherein frequency data of said BAW device comprises data indicative of said acceleration.

16. The sensor of claim 14 wherein said acoustic wave Device comprises a SAW-R device, wherein frequency data of said SAW-R device comprises data indicative of said acceleration.

17. The sensor of claim 14 wherein said acoustic wave device comprises a SAW-DL device, wherein a phase of said SAW-DL device comprises data indicative of said acceleration.

18. The sensor of claim 14 wherein said plate comprises a piezoelectric substrate.

19. The sensor of claim 14 wherein said acceleration data for wireless transmission from said antenna is based on at least one parameter change produced in an acoustic phase velocity associated with said acoustic wave device.

* * * * *